United States Patent [19]

Holm et al.

[11] Patent Number: 4,686,851

[45] Date of Patent: Aug. 18, 1987

[54] METHOD AND APPARATUS FOR DETECTING LEAKS

[76] Inventors: Albert E. Holm, 7259 First St., Marine City, Mich. 48039; Grant A. Holm, 8454 Rattle Run, Richmond, Mich. 48062

[21] Appl. No.: 802,042

[22] Filed: Nov. 26, 1985

Related U.S. Application Data

[63] Continuation of Ser. No. 579,701, Feb. 13, 1984, abandoned, which is a continuation of Ser. No. 332,885, Dec. 21, 1981, Pat. No. 4,430,891.

[51] Int. Cl.⁴ .............................................. G01M 3/32
[52] U.S. Cl. .................................................... 73/49.2
[58] Field of Search ......................................... 73/49.2

[56] References Cited

U.S. PATENT DOCUMENTS 3,074,265  1/1963  Symons ................................ 73/49.2
3,527,909  9/1970  Torre ................................ 73/49.2 X
3,583,210  6/1971  Orr ....................................... 73/49.2
3,921,436  11/1975  Plegat .............................. 73/49.2 X
4,532,795  8/1985  Brayman et al. ................ 73/49.2 X

FOREIGN PATENT DOCUMENTS 1372780  11/1974  United Kingdom ................ 73/49.2

Primary Examiner—Stewart J. Levy
Assistant Examiner—Joseph W. Roskos
Attorney, Agent, or Firm—Burton, Parker & Schramm

[57] ABSTRACT

A method and apparatus for quickly determining leakage of a test chamber in a production environment wherein a reference chamber is exposed to the same temperature effects as those existing in the test chamber and gas pressures are applied to the reference and test chambers and the pressures are compared in the test and reference chambers and relative changes of such pressures are read as a function of leakage.

17 Claims, 4 Drawing Figures

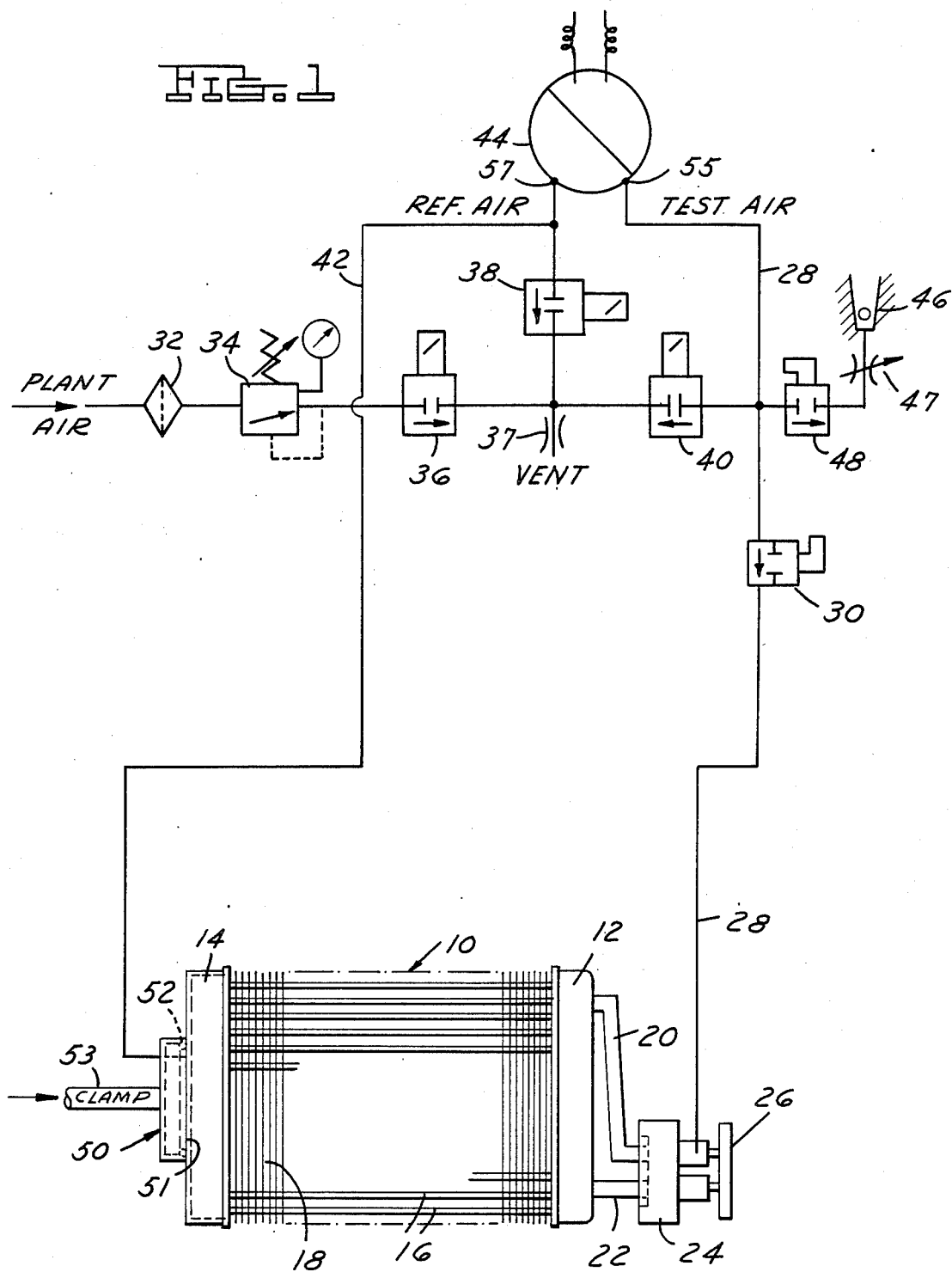

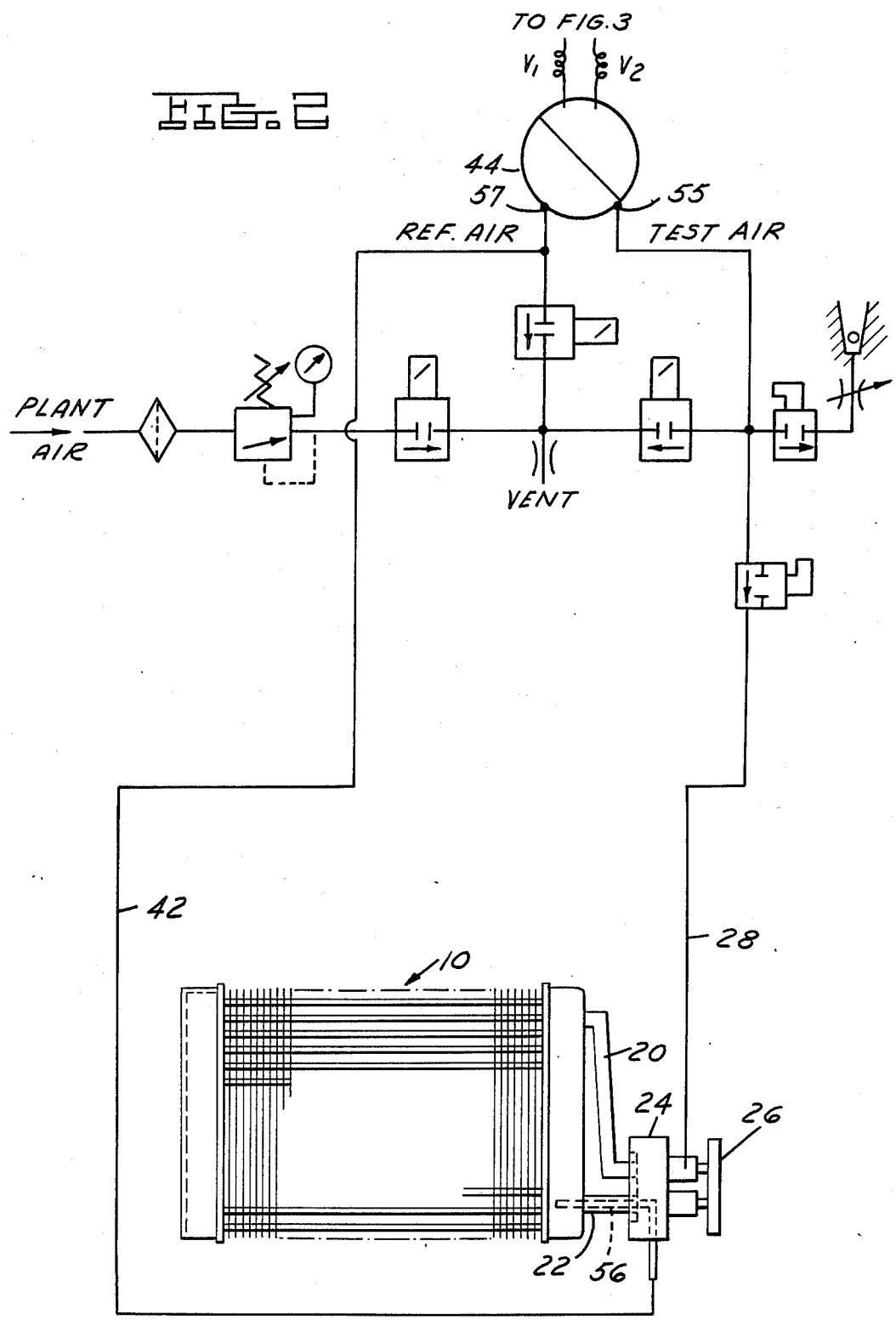

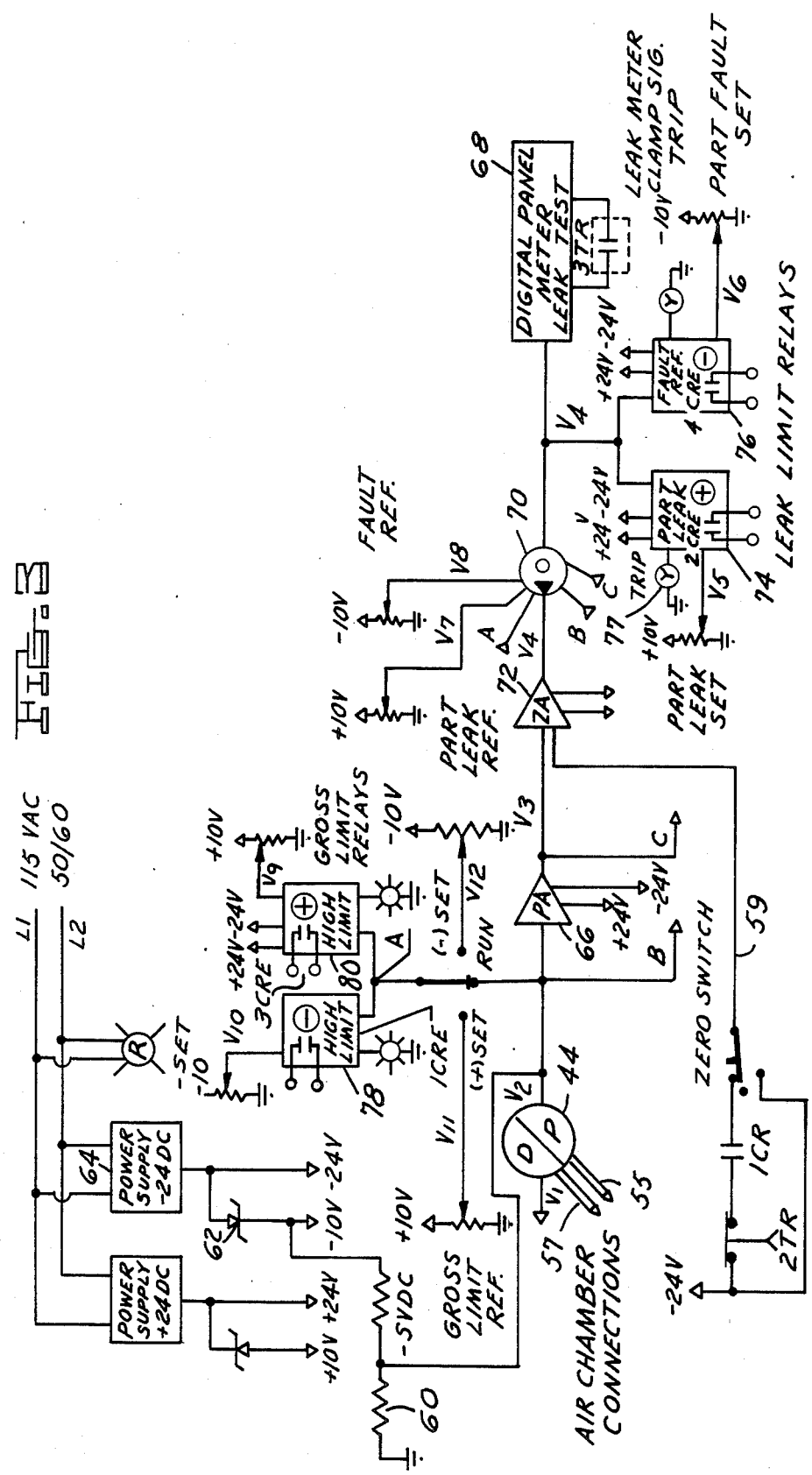

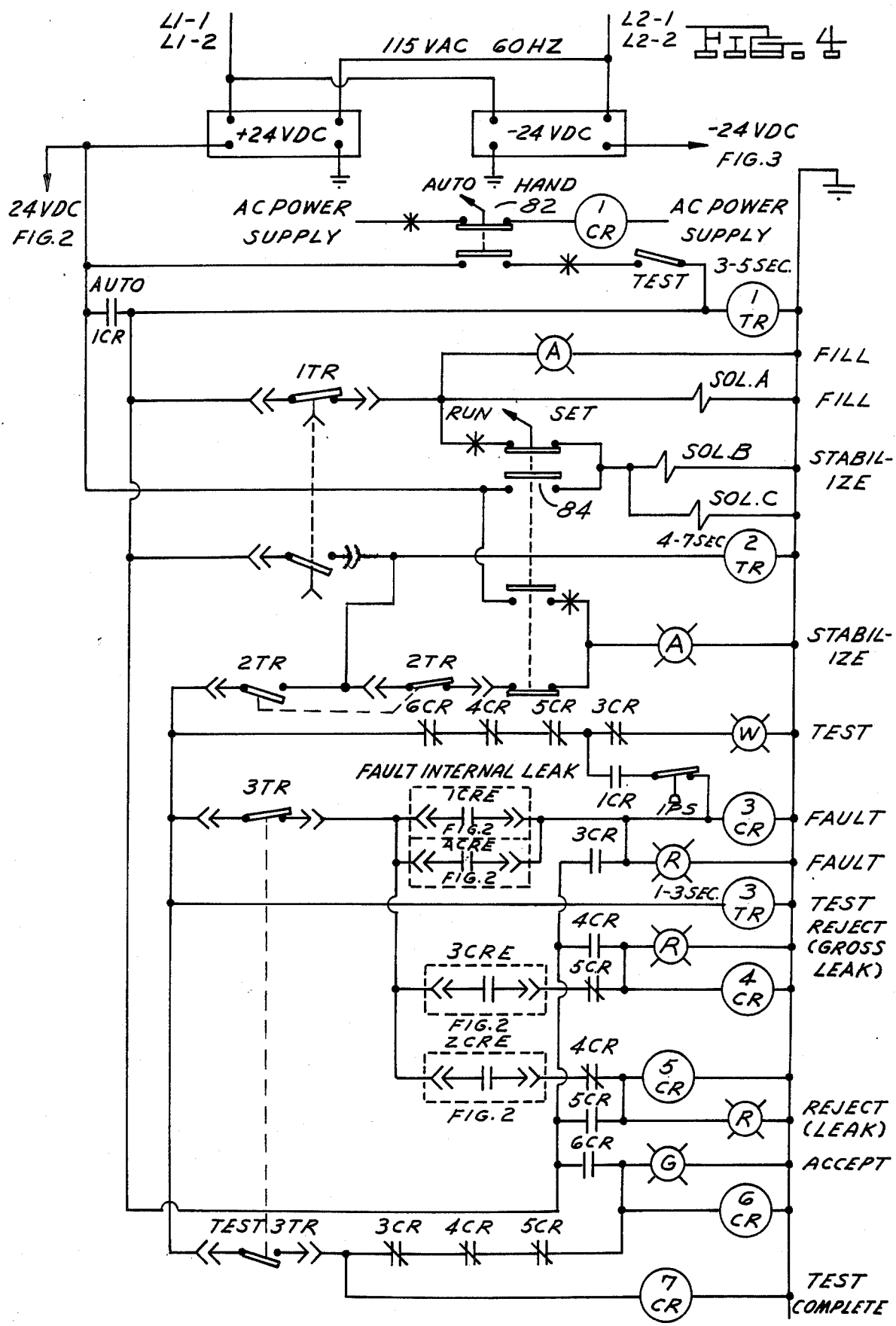

METHOD AND APPARATUS FOR DETECTING LEAKS

This application is a continuation of U.S. Application Serial No. 579,701, filed Feb. 13, 1984, now abandoned, which was a continuation-in-part of U.S. Application Serial No. 332,885, filed Dec. 21, 1981, and issued as U.S. Patent 4,430,891, Feb. 14, 1984.

FIELD OF INVENTION

This invention relates to leak detection by comparing gas pressures in a reference chamber with that in a test chamber and reading the rate of change in the pressure difference as a function of leakage of the test chamber.

BACKGROUND OF THE INVENTION

In the manufacture of internal combustion engine cylinder blocks, automotive heat exchangers such as radiators or heater cores, automobile fuels tanks and the like, it has long been necessary to test the same for leaks before approving them for use. Various approaches have been taken to this leak testing, some of which are shown in the following U.S. Pat. Nos.: 2,874,566, 3,221,539, and 4,047,423. Despite these and other prior efforts, the need remains for leak detection which may be carried out in but a few seconds.

Heretofore leak testing using air as a testing medium required anywhere from five to 12 seconds for the air temperature in the chamber being tested to stabilize before the leak test was effected. Without this stabilization, temperature changes of the air in the chamber being tested would give a false reading. Such temperature changes could result from the adiabatic cooling effect of compressed air expanding as it is released into the chamber, or if the chamber walls were cooler or warmer than the air introduced into the chamber, heat transfers and consequent pressure changes would occur. With the requirement to increase production so that more parts could be tested in a given period of time, there has been the concurrent need to reduce the stabilization time.

Also, serious errors in leak detection based on the use of air as a test medium could arise in the production environment of a large manufacturing plant as a result of diurnal temperature variations which, in some instances, might be as much as 20° F. in a 12-hour period. With this kind of variation, even a test taking less than one minute may permit a sufficiently significant temperature change in the test chamber, rendering wholly inaccurate a leak test based on air pressure change. Thus, there has been a need to neutralize these diurnal temperature effects which would cause changes in the temperature of the chamber being tested and distort the efficacy of the leak test.

Another error which could distort the accuracy of prior art leak testers might arise from the lack of uniformity of temperature of the parts being tested. For example, parts which have been waiting for some hours at room temperature to be leak tested might be cooler than parts coming directly from a parts washer, and yet if this temperature difference is not compensated for, there will be inaccuracies in the test results, viz., those parts which are warmer will tend initially to heat the air to the part temperature and thereafter when the test is being performed the air will be cooling as the part cools and create a pressure drop simulating a leak when a leak may not in fact exist. Thus, the need to compensate for such errors was an important problem to be solved in arriving at a satisfactory leak tester.

Because of the difficulties of leak testing structures, such as automobile radiators or fuel tanks and occasionally engine blocks using air as a test medium, such products are often tested in large waterbath type testing machines relying on visual detection of air bubbles to signal leaks. As such a method is slow and relies heavily on human eyesight, a faster and more reliable method has been needed for some time.

SUMMARY OF THE INVENTION

Our invention overcomes the aforementioned difficulties of the prior art while nevertheless utilizing a fluid that is thermally sensitive, such as air, by neutralizing the effect of pressure changes occurring as a result of temperature changes of the air in the chamber being tested (hereinafter termed the "test chamber"). We accomplish this by providing a reference chamber having a volume-to-wall surface ratio of known or determined relation to the volume-to-wall surface ratio of the test chamber. We expose this reference chamber to the same temperature effects as the chamber to be tested, which may be accomplished by placing the reference chamber in heat transfer relation with the chamber to be tested to equalize temperatures therebetween. Then we apply equal gas pressures to the reference and test chambers and read the change in pressures between the two chambers as a function of leakage. As a result of this method, we are able to reduce stabilization time from a period of 5 to 12 seconds to a period from 2 to 6 seconds, and both temperature of the test chamber as well as ambient temperatures are substantially neutralized because both chambers are affected equally.

DESCRIPTION OF THE DRAWINGS

FIG. 1 is a schematic drawing of an apparatus embodying our leak detector;

FIG. 2 is a schematic drawing of an apparatus embodying a modified form of our leak detector;

FIG. 3 is an electric schematic of the power supply and a portion of the control circuitry; and FIG. 4 is an electric schematic of the remainder of the control circuitry.

BRIEF DESCRIPTION OF A PREFERRED EMBODIMENT

Referring to FIG. 1, an automobile heat exchanger, such as a heater core, is shown at 10, having a pair of headers 12 and 14 between which extend cooling tubes 16 having radiating fins 18. Hereinafter the water core, which is merely exemplary of the type of device which may be tested by our invention, is occasionally referred to as the test chamber. A pair of hook-up pipes 20 and 22 extend from header 12, and are normally used to connect the core into the heater, one pipe serving as an inlet and the other as an outlet.

The purpose of our invention is to determine the integrity of this heater core and its pipes 20 and 22 rapidly and accurately, and while we have shown the apparatus and circuitry schematically, such will enable essentially automated equipment in a production line environment in a manufacturing or assembly plant.

The leak detector includes a releasable connector 24 intended to be sealingly fastened to the pipes 20 and 22. For this purpose the heat exchanger may be placed in a test station on a suitable support, not shown, and the connector 24 is then manually or automatically plugged over the ends of the pipes to be held there by a clamping device 26. In the embodiment shown, the end of pipe 22 will be plugged by the connector against the displacement of air into or therefrom while the end of pipe 20 will be placed in communication with test air line 28 on the downstream side of isolation (on/off) valve 30.

A source of compressed air termed "plant air" is delivered to the leak detector through a filter 32, a pressure regulator 34 and a solenoid valve 36. Air from valve 36 is delivered to the two sides of the leak detector circuit, the test air side and the reference air side, by way of a vent orifice 37 and a pair of solenoid valves 38 and 40. Valve 38 controls communication with the reference air line 42 which is connected to one side of the differential pressure cell 44. Solenoid valve 40 controls communication with the test air line 28 and the test side of the differential pressure cell 44. A flow meter 46 having a flow control valve 47 is connected to the test side of the circuit through a control valve 48, and is for purposes of calibrating the system.

The reference air line 42 is connected to a reference chamber 50 that has an open side 51 that is removably clamped in sealed heat transfer relation against the header 14. The reference chamber 50, when clamped against the header, has a volume-to-wall surface ratio of known or determined relation to the volume-to-wall surface ratio of the heat exchanger 10 so that the effects of temperature changes can be equalized. Desirably, the relationship of volume-to-wall ratios between the two chambers will be equal, but if not, the control circuitry of FIG. 3 may be adjusted to compensate therefor as hereinafter described. The reference chamber 50 may assume a variety of configurations in order to adapt it for heat transfer relation with the test chamber. As shown in FIG. 1, it is generally dish-shaped with a sealing ring 52 at its rim to effect an airtight seal with the surface of header 14. Suitable clamping means 53 is schematically shown for holding the reference chamber in sealed relation with the test chamber.

In FIG. 2 we have shown a modified form of the reference chamber which comprises a hollow test probe 56 which is connected to the air line 42 and is disposed in the test chamber so that the walls of the probe are in direct heat transfer relation with the air in the test chamber. The probe may comprise a plurality of tubes closed at one end and communicating at the other with the line 42. The combined surface area of the tubes in relation to their combined volumes should desirably bear the same ratio as the surface area of the test chamber in relation to its volume. The probe may conveniently enter the test chamber through the pipe 22 and be carried by the releasable connector 24. As a result of being disposed in the test chamber, the probe will be subjected to the same temperature effects as the temperature effects in the test chamber. This will materially reduce stabilization time and because the chambers are in heat transfer relation, differences in chamber temperatures are minimized throughout the testing procedures.

In FIGS. 3 and 4 we have shown power supply and control circuits for the FIGS. 2 and 3 embodiments. These circuits will be explained in terms of their operation, and it will be assumed that the test system is connected to a source of plant air and the test chamber connected to line 28 and the reference chamber, either 50 or 56, disposed in heat transfer relation with the test chamber.

A suitable differential pressure cell 44 is manufactured by the Foxboro Company of Foxboro, Mass., U.S.A., under Model No. 823. This provides an analog output voltage which varies in accordance with the pressure differential between the two chambers. The pressure in the test chamber is applied to the "low pressure" port 55 of the cell 44 and the pressure of the reference chamber 50 is applied to the "high pressure" port 57 of the cell. The voltage output of the cell which will appear at $V_2$ in FIG. 3, is adjusted by means of its own "zero" adjustment to emit a voltage of approximately 5 volts D.C. The voltage at $V_2$ is then neutralized by a fixed negative 5 volts D.C. that is obtained from a resistance bridge 60 which is powered from the $-10$ volt Zener diode 62 which is part of the negative power supply system 64. The "zero adjustment" of the cell 44 is used to precisely match and neutralize the actual output of the resistance bridge 60.

Neutralizing the positive voltage output from the differential pressure cell 44 allows relatively high voltage amplifications of minute voltage changes in cell 44 while having the output from the progressive steps of amplification within safe instrument voltage levels, such as 10 volts D.C., or less. In addition, the net zero voltage output from the electronic system, when the transmitter 44 is zero-biased by 5 volts D.C., and when the air pressures are equal, provides a way to emit a negative output from the pressure cell 44 which in fact only has a positive range. Pressure changes in the differential between the two chambers are indicated as positive voltages when the pressure in the reference air line 42 is actually higher than the pressure in the test chamber line 28, and conversely, the net voltage output of the system is negative when the pressure in line 28 is actually higher than the pressure in the line 42.

The net voltage output of the differential pressure cell 44 which appears at $V_2$ is applied to the input terminal of the preamplifier 66 which establishes a mathematical relationship between the volumetric rate of air leakage and the ultimate display on the voltmeter 68. The voltage display is preferably digital and is displayed as a reference number or, in engineering units, such as cc's per minute, cubic inches per minute, etc. The preamplifier may be any adjustable gain general purpose amplifier such as the A.T.C. Model 65012700500, equipped with a suitable range module such as A.T.C. 65012704100. The diagnostic selector switch 70 is used to read the input and output voltages of the preamplifier 66 in order to calculate the actual gain of the range module and provide a precise adjustment.

The output of the preamplifier appears at $V_3$ and is connected to the input of the zero amplifier 72. The zero amplifier may be an A.T.C. 65012705600, with a suitable range module such as is used with the preamplifier 66. The zero amplifier has two functions: First, to provide additional amplification for establishing a relationship of voltage change to be read in relative engineering units; and second, to force a zero voltage output, such as 0.00 volts, that will be displayed on the digital volt-meter 68 as 000 regardless of the actual pressures at the lines 28 and 42. In other words, the zero amplifier 72 is used to compensate for slight differences in pressures in lines 28 and 42, or, within the test and reference chambers. The air pressure first admitted to the test and reference chambers is nominally equal in both chambers. The slight differences in actual pressures resulting from the pressure drops in the lines 28 and 42 may thus be equalized in the electronic circuit of FIG. 3 by the amplifier 72. The voltage at $V_3$ from the preamplifier is removed from the voltage $V_4$ by applying a control voltage, such as 24 V D.C. either positive or negative, to terminals of the amplifier from the "zero switch" circuit 59. When the control voltage is switched off, the output of the zero amplifier reflects the change in voltage that occurs at $V_3$. This voltage change is multiplied by the gain of the range module. The range module can have a gain of 1-1 up to 200-1. After the air is admitted to the chambers, for which 3-5 seconds would normally be allowed, the system will then be stabilized as hereinafter indicated. Between 4-7 seconds are generally sufficient for stabilization in a typical application, though both this and the fill time may have to be varied depending upon the size of the chambers involved.

Within the testing sequence, the output of the zero amplifier 72 is displayed as 000 on the meter 68 by applying the control voltage from circuit 59 until the air pressure in the system comes to a reasonable degree of stability. After filling the system with air, the air supply is turned off by closing valves 38 and 40 and the system is allowed to stabilize. In a typical application, this will require between 4-7 seconds. After stabilization, during which time the temperature effects in the reference and test chambers are equalized, the actual test phase commences by switching off the control voltage from circuit 59 to let the subsequent voltage changes that occur pass through the zero amplifier 72 to the meter 68.

With the diagnostic switch 70 in the run position, the voltage at $V_4$ is displayed on the meter 68. $V_4$ is also applied to the two leak limit relays 74 and 76. The relays are of the electronic type, such as A.T.C. Model 650127009, which cause contacts to change whwnever the input voltage $V_4$ is equal to a reference voltage $V_5$ or $V_6$. An acceptable leakage range is established for the test chamber by having the relay 74 set to change at an output from the zero amplifier that is positive, indicating a part leak, while relay 76 is set to change at a minus voltage that matches the value of the "part fault set" control. The zero amplifier 72 multiplies any voltage input at $V_3$. While the control voltage is applied there is no output at $V_4$. $V_4$ will show only those changes that occur after the control from circuit 59 is released. It is possible to have a situation in which no change occurs after the control voltage is released. If, for example, the test chamber has a large leak, it would be possible for all the test air to leak out while the supply air was shut off and the control voltage was supplied to the zero amplifier. In such a case, no pressure change would occur during the test phase, and the test chamber could be presumed to be good. To provide for detection of gross leaks as above mentioned, a pair of leak limit relays 78 and 80 are provided to monitor the voltage at $V_2$ preceding both the preamplification and zero functions. These relays, which may be similar to relays 74 and 76, are set to reject the test of a test chamber when the voltage at $V_2$ exceeds the normal range by more than 50%. Setting the relays 78 and 80 is accomplished by putting the diagnostic switch 70 on contact A to apply a reference voltage to both the digital meter 68 and the limit relays 78 and 80. The desired trip point or "part leak reference" is applied to the meter and relays such as a voltage at $V_7$ for allowed leak limit of the test chamber. Then the voltage at $V_5$, "Part Leak Set" is adjusted to equal the voltage at $V_7$. An amber signal light 77 is illuminated by the relay 74. The other relays are set in a similar manner with other pairs of voltage controls, sensing voltages at $V_6$ and $V_8$, $V_9$ and $V_{11}$, and $V_{10}$ and $V_{12}$, and suitable signal lights may be provided to thus indicate gross leaks of either chamber or a small leak of the reference chamber. Thereafter during the test, for example, when the voltage at $V_4$ equals the voltage setting at $V_5$ the amber light 77 will be illuminated and a set of contacts in relay 74 will cause the test to be rejected as shown in FIG. 4 by energizing 5 CR. It will be appreciated by those skilled in this art that either of the chambers may in fact leak, but as long as the leak is within acceptable limits it is not objectionable, and the test system may thus be adjusted to approve a test chamber whose leak is within the acceptable range.

Referring now to FIG. 4 and its sequence of operations, the toggle switch 82 is placed in position for auto-operation by allowing alternating current power to make and hold 1 CR until the test result is registered in the control. The cycle is held on as long as possible to maintain the test results for the operator to read.

During a test cycle, the first operation is to fill the chambers which, in a typical application, will require 3-5 seconds. This is accomplished by having 1 CR energized which in turn makes 1 TR to supply air through solenoid valves 36, 38 and 40 until 1 TR times out (approximately 3-5 seconds). The vent 37 shown in FIG. 1 is a small 0.015-0.020 diameter hole that will bleed air from between valves 36, 38 and 40 so that the resulting pressure differential helps to maintain the valves closed. In addition, the vent provides an escape path to atmosphere so that in the event either valve 38 or 40 leaks, the air loss will be reflected as a leak by the relays 74, 76, 78 or 80. If the "leak" tends to repeat, then the operator may suspect a malfunction of one of the valves.

The next stage is to allow for stabilization of the air admitted to the reference and test chambers. When 1 TR times out, it serves to make 2 TR, thereby allowing air in the test chamber to stabilize before the test measurement is made. While 2 TR (NC) is closed in circuit 59 in FIG. 3 and with 1 CR closed, a $-24$ volts will be applied to the zero amplifier 72, thereby causing the voltage output of the amplifier 72 to be read at the panel meter 68 at 000, regardless of the input signal at $V_3$. When 2 TR times out, it releases the zero amplifier 72 and allows voltage changes of the differential pressure cell 44 to be amplified and fed to the meter 68 and decision making relays 2 CRE and 4 CRE in the leak limit relays 74 and 76.

Time delay relay 3 TR times the actual test period and is normally set for from between 1-3 seconds. If a reject does not occur within the test period, 3 TR times out to bring in 6 CR "accept". When the test is terminated by 3 CR, 4 CR or 5 CR (reject fault, gross leak, or leak), the decision is locked in and prevents an "accept". 3 TR continues and times out to clamp meter 68 to indicate a total change for the test period and to make 7 CR indicating the end of the test.

3 CRE is controlled by the plus voltage at $V_2$. When the voltage exceeds, for example, 2-3 volts DC, such as might be caused by an excessive leak, for example, a missing seal or a defective connection, 3 CRE makes 4 CR to illuminate a red light on the test panel and provides a signal which can be used to abort the test. Similarly, if 1 CRE closes in the relay 78, 3 CR is energized indicating a gross leak in the reference chamber and results in a fault reject.

4 CRE looks at the output of amplifier 72 at $V_3$ for a negative output associated with an internal leak. Closure of 4 CRE brings in 3 CR fault/internal leak output relay 76.

The run set switch 84 is used to vent off the air pressure on each side of the differential cell 44 when adjusting the output voltage of the cell.

What is claimed is:

1. The method of quickly determining leakage of a test chamber in a production environment, comprising the steps of:
   providing a reference chamber having a volume-to-wall surface ratio of determined relation to the volume-to-wall surface ratio of the test chamber;
   applying gas pressures to the reference and test chambers;
   rapidly equalizing the gas temperatures in the respective chambers by exposing opposite sides of a wall of one of said chambers which is common to both chambers simultaneously to the gas in each chamber; and
   comparing the pressures in the test and reference chambers and reading a relative change of such pressures as a function of leakage.

2. The invention defined by claim 1 wherein the reference chamber comprises an open sided vessel, the open side of which is fluid tightly clamped against a wall of the test chamber to simultaneously expose opposite sides of such wall to the gas in each chamber to establish heat transfer relation between the two chambers.

3. The invention defined by claim 1 wherein the reference chamber is disposed within the test chamber to simultaneously expose opposite side of the reference chamber wall to the gas in each chamber to establish heat transfer relation between the two chambers.

4. The invention of claim 2 or claim 3 further comprising the step of comparing the pressures in the test and reference chambers and determining, based upon relative changes in pressure, if a leak has occurred in the reference chamber.

5. The invention defined by claim 1 wherein the volume-to-wall surface ratios of the two chambers are substantially equal.

6. The invention defined by claim 1 wherein an unusual difference in the pressures in the two chambers is read as a defective test resulting from gross leakage.

7. The invention defined by claim 1 wherein nominally equal gas pressures are applied to the reference and test chambers.

8. The invention of claim 1 further comprising the step of comparing the pressures in the test and reference chambers and determining based upon relative changes in pressure if a leak has occurred in the reference chamber.

9. Apparatus for detecting leaks in a test chamber comprising, in combination:
   means defining a reference chamber having a volume-to-wall surface ratio of known relation to the volume-to-wall surface ratio of the chamber to be tested;
   said means so defining the reference chamber that a wall of the reference chamber is common to both chambers and exposed on one side directly to gas in the test chamber and on the opposite side directly to gas in the reference chamber to permit rapid equalization of gas temperatures in the respective chambers;
   means for applying gas pressures to the test chamber and reference chamber; and
   means for sensing a change in the gas pressure differential in the two chambers and reading a change as a function of leakage.

10. The invention defined by claim 9 wherein control means is provided for initiating operation of the means for applying pressures to the chambers and the means for comparing the pressures to initiate operation thereof in a predetermined cycle of operation, said control means including a time delay function between initiation of the gas applying means and the pressure comparing means to allow at least partial temperature stabilization of the test and reference chambers before comparing the pressure differentials therein.

11. The invention defined by claim 9 wherein the means defining the reference chamber comprises an opensided vessel whose open side is adapted to be clamped in fluid sealed relation against a wall of the test chamber.

12. The invention defined by claim 9 wherein the means defining the reference chamber comprises a hollow probe adapted to be inserted in fluid sealed relation within the test chamber to be exposed to gas therein.

13. The invention of claim 11 or claim 12 wherein the means for sensing a change in gas pressure differential will indicate if leakage has occurred in either the test or reference chamber.

14. The invention defined by claim 9 wherein the means for sensing a change in the gas pressure differential comprises a differential pressure cell producing an output voltage which varies with differential pressure changes, wherein means are provided for adjusting such output voltage to provide a zero value though the actual pressures in the reference and test chambers differ by a determined amount, and a voltmeter calibrated in units for measuring chamber leakage and responsive to said output voltage for reading changes therein as a function of chamber leakage.

15. The invention defined by claim 9 wherein said means for applying gas pressures to the test chamber and reference chamber are adapted to apply nominally equal gas pressures thereto.

16. The invention of claim 9 wherein the means for sensing a change in gas pressure differential is operable to indicate if leakage has occurred in either the test or reference chamber.

17. In a system for detecting leaks wherein fluid pressure is supplied to two circuits from a common source:
   a valve controlling delivery of fluid pressure from said source;
   a pair of fluid pressure circuits each having a valve connected to the downstream side of the first mentioned valve with each valve of said pair operable to isolate its circuit;
   means providing a continuous vent to atmosphere between the pair of valves and the first mentioned valve whereby closure of all the valves will vent the connection between them to atmosphere; and
   means for detecting a leak of either valve of said pair of reading changes in the differential pressures in the pair of circuits.

* * * * *

UNITED STATES PATENT AND TRADEMARK OFFICE
CERTIFICATE OF CORRECTION

PATENT NO. : 4,686,851

DATED : August 18, 1987

INVENTOR(S) : Albert E. Holm and Grant A. Holm

It is certified that error appears in the above-identified patent and that said Letters Patent is hereby corrected as shown below:

In column 8, line 63, change "of" to --by--

Signed and Sealed this

Ninth Day of February, 1988

Attest:

DONALD J. QUIGG

*Attesting Officer*  *Commissioner of Patents and Trademarks*